(12) United States Patent
Ota et al.

(10) Patent No.: US 12,486,416 B2
(45) Date of Patent: Dec. 2, 2025

(54) AQUEOUS INK, INK CARTRIDGE AND INK JET RECORDING METHOD (71) Applicant: CANON KABUSHIKI KAISHA, Tokyo (JP)

(72) Inventors: Takeshi Ota, Kanagawa (JP); Katsuhiro Hayashi, Kanagawa (JP); Tsuyoshi Furuse, Kanagawa (JP); Keiichi Ito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 695 days.

(21) Appl. No.: 17/870,680

(22) Filed: Jul. 21, 2022

(65) Prior Publication Data

US 2023/0039150 A1 Feb. 9, 2023

(30) Foreign Application Priority Data

Jul. 28, 2021 (JP) .................. 2021-123600
Jun. 30, 2022 (JP) .................. 2022-106239

(51) Int. Cl.
C09D 11/38 (2014.01)
B41J 2/175 (2006.01)
B41M 5/00 (2006.01)
C09D 11/033 (2014.01)
C09D 11/037 (2014.01)
C09D 11/102 (2014.01)
C09D 11/107 (2014.01)
C09D 11/322 (2014.01)

(52) U.S. Cl.
CPC ........... *C09D 11/38* (2013.01); *B41J 2/17503* (2013.01); *B41M 5/0023* (2013.01); *C09D 11/033* (2013.01); *C09D 11/037* (2013.01); *C09D 11/102* (2013.01); *C09D 11/107* (2013.01); *C09D 11/322* (2013.01)

(58) Field of Classification Search
CPC ...................................................... C09D 11/38
See application file for complete search history.

(56) References Cited

U.S. PATENT DOCUMENTS 6,254,231 B1 * 7/2001 Suzuki ............... B41J 2/17503
347/100
6,398,355 B1 * 6/2002 Shirota .................. C09D 11/38
347/100

FOREIGN PATENT DOCUMENTS

| JP | 2010202765 A |   | 9/2010 |
|----|--------------|---|--------|
| JP | 2015203036   | * | 11/2015 |
| JP | 2019018563 A |   | 2/2019 |
| JP | 2021008563 A |   | 1/2021 |

* cited by examiner

*Primary Examiner* — Wenwen Cai
(74) *Attorney, Agent, or Firm* — Canon U.S.A., Inc. IP Division (57) ABSTRACT An aqueous ink jet ink contains a pigment, a resin and an additive. The resin has a unit containing a carboxylic acid group and a unit containing an aromatic group. The additive is at least one member selected from the group consisting of butanedicarboxylic acid, pentanedicarboxylic acid, pentanetricarboxylic acid, hexanedicarboxylic acid, hexanetricarboxylic acid, heptanetricarboxylic acid, octanetricarboxylic acid and nonanetricarboxylic acid. The content (ppm) of the additive is 180 ppm or more to 1,200 ppm or less with respect to the total mass of the ink.

16 Claims, 2 Drawing Sheets

AQUEOUS INK, INK CARTRIDGE AND INK JET RECORDING METHOD

BACKGROUND OF THE INVENTION

Field of the Invention

The present disclosure relates to an aqueous ink, an ink cartridge and an ink jet recording method.

Description of the Related Art

Pigment ink containing pigment is likely to increase fastness and, accordingly, has been widely used as ink used in ink jet recording methods in recent years. In the fields of photography and graphic arts, it is desired to record more high-definition and more glossy images. Such a field desires ink to have a high level of storage stability to ensure consistent image recording, even though the ink jet recording apparatus is used over a long period. Additionally, the pigment in pigment ink is particulate, and images recorded on recording media with a glossy surface (what are called gloss papers) with pigment ink tend to be inferior in terms of image clarity to dye ink, which uses dye as the coloring material. The term "image clarity" refers to the sharpness of an image projected on the surface of a recorded image. When the image clarity is low, the projected image is blurred; and when the image clarity is high, the projected image is clear.

Various techniques have been studied for improving ink jet suitability by materials added to pigment ink. For example, Japanese Patent Laid-Open Nos. 2019-18563 and 2010-202765 describe pigment inks containing an additive having a specific functional group.

The present inventors examined the storage stability of pigment inks containing the additives proposed in Japanese Patent Laid-Open Nos. 2019-18563 and 2010-202765 and the image clarity of images recorded with such pigment inks. As a result, it was found that known combinations of constituents of pigment ink are unlikely to enable the ink to have both high storage stability and high image clarity.

SUMMARY OF THE INVENTION

Accordingly, the present disclosure provides an aqueous ink jet ink that has high storage stability and can form images with high image clarity, an ink cartridge using the aqueous ink and an ink jet recording method.

More specifically, the ink according to the present disclosure is an aqueous ink jet ink containing a pigment, a resin and an additive. The resin has a unit containing a carboxylic acid group and a unit containing an aromatic group. The additive is at least one member selected from the group consisting of butanedicarboxylic acid, pentanedicarboxylic acid, pentanetricarboxylic acid, hexanedicarboxylic acid, hexanetricarboxylic acid, heptanetricarboxylic acid, octanetricarboxylic acid and nonanetricarboxylic acid. The content (ppm) of the additive is 180 ppm or more to 1,200 ppm or less with respect to the total mass of the ink.

Further features of the present disclosure will become apparent from the following description of exemplary embodiments with reference to the attached drawings.

DESCRIPTION OF THE EMBODIMENTS

The present disclosure will be described in more detail below with reference to preferred exemplary embodiments. In the present disclosure, in a case where the compound is a salt, the salt is present in a state dissociated into ions in an ink, which is, however, expressed as "salt is contained" for convenience. The "molecular chain length of an alkyl chain" is represented by the number of carbons forming the longest chain structure in the molecule, except for the carbon atoms forming substituents, such as the carboxylic acid group. A "unit" of a resin refers to the smallest repeating unit of the resin and is formed by (co) polymerization of one monomer. Aqueous ink jet ink may also be referred to simply as ink. Physical properties mentioned herein are those at room temperature (25° C.) unless otherwise specified.

The present inventors have studied resin and additives to be added to ink in various ways to improve the storage stability of ink and the image clarity of the image recorded with the ink. As a result, the inventors found that the use of a resin having a unit containing a carboxylic acid group and a unit containing an aromatic group and a specific additive increases the storage stability of the ink and the image clarity of the recorded image. The additive has the following features. The additive is a compound containing an alkyl chain with a molecular chain length of 4 or more to 9 or less and two or three carboxylic acid groups. More specifically, the additive is a compound selected from the group consisting of butanedicarboxylic acid, pentanedicarboxylic acid, pentanetricarboxylic acid, hexanedicarboxylic acid, hexanetricarboxylic acid, heptanetricarboxylic acid, octanetricarboxylic acid and nonanetricarboxylic acid. In other words, the additive used in the ink disclosed herein is an alkanedicarboxylic acid or alkanetricarboxylic in which the molecular chain length of the alkyl chain and the number of carboxylic acid groups are each in a specific range. The present inventors think the mechanism of how the above-described resin and additive increase the storage stability of the ink and the image clarity of the image recorded with the ink is as follows.

To increase the storage stability of an ink containing resin, the particle surface of the pigment adsorbs the resin to retain the resin around the surface of the pigment. This requires that the resin has a hydrophobic portion capable of interacting with the particle surface of the pigment to promote the adsorption and a hydrophilic portion that is compatible with the aqueous medium and enables the resin to extend from the particle surface of the pigment to the aqueous medium to form a steric barrier for repulsion. In a resin having a unit containing a carboxylic acid group and a unit containing an aromatic group, the aromatic group is hydrophobic and therefore has an affinity for the intrinsically hydrophobic particle surface of the pigment. Accordingly, at least one of Van der Waals force, π-π interaction and hydrophobic interaction allows the resin to adsorb onto the particle surface of the pigment. The carboxylic acid group is hydrophilic and has an affinity for water that is the major constituent of the aqueous medium. Accordingly, the carboxylic acid group is attracted toward and expands sterically into the aqueous medium to form a steric barrier producing repulsion. Such a resin thus can reduce aggregation of pigment and accompanying increase in the particle size of the pigment.

When ink applied onto a recording medium forms an image, the aqueous medium in the ink penetrates the recording medium and volatilizes and ink is thus concentrated to cause the pigment to start aggregating. At this time, the particles of the pigment very closely approach each other, and the resin adsorbed onto the particle surface of the pigment is allowed to interact with other particles of the pigment around the resin, thus eliminating the repulsion by the steric barrier and promoting the aggregation of the pigment. Consequently, the pigment is unevenly distributed at the surface of the image, reducing the image clarity of the recorded image. Hence, the resin having a unit containing a carboxylic acid group and a unit containing an aromatic group is advantageous in increasing the storage stability of the ink but is likely to reduce the image clarity of the recorded image.

Probably, increasing the image clarity of the recorded image requires that the pigment be evenly deposited on a recording medium when an image is formed by applying ink onto the recording medium. The ink on a recording medium is concentrated by penetration and volatilization of the aqueous medium in the ink, and the pigment thus aggregates to form an image. At this time, if the ink contains any of the above-described alkanedicarboxylic acids and alkanetricarboxylic acids as an additive, the additive exhibits an affinity for the particle surface of the pigment and the resin having the unit containing an aromatic group because of the presence of the hydrophobic alkyl chain. Consequently, the additive can be present in the vicinity of the particle of the pigment while the ink is being concentrated and the pigment is aggregating. Consequently, the electrostatic repulsion of the carboxylic acid group inhibits the rapid aggregation of the pigment. Hence, when an image is formed, the pigment is evenly distributed on the recording medium, increasing the image clarity of the recorded image.

In contrast, if the additive is an alkanemonocarboxylic acid, the additive is less soluble in the aqueous medium due to the smaller number of carboxylic acid groups. Accordingly, the additive is adsorbed onto the particle surface of the pigment and remains at the surface. Consequently, while the ink is being concentrated and the pigment is aggregating, only the additive adsorbed onto the particle surface of the pigment cannot sufficiently inhibit the aggregation of the resin at the particle surface of the pigment. Thus, when an image is formed, the rapid aggregation of the pigment cannot be inhibited, resulting in poor image clarity of the recorded image. If the additive has four or more carboxylic acid groups, the entire molecule of the additive is highly hydrophilic. Accordingly, the additive desorbs easily from the particle surface of the pigment even though it is adsorbed onto the particle surface. Also, since such an additive has a high solubility in the aqueous medium because of its high hydrophilicity, while the ink is being concentrated and the pigment is aggregating, the additive can penetrate the recording medium with the aqueous medium and may remain locally at the surface of the ink droplet after the aqueous medium volatilizes. Consequently, when an image is formed, the additive cannot remain around the pigment particle, resulting in poor image clarity of the recorded image.

Even if the additive is an alkanedicarboxylic acid or an alkanetricarboxylic acid, the additive is highly hydrophilic as the entire molecule when the molecular chain length of the alkyl chain is 1 to 3 because such an additive has a larger number of hydrophilic carboxylic acid groups for the hydrophobic alkyl chain. Consequently, when an image is formed, the additive cannot remain around the pigment particle, resulting in poor image clarity of the recorded image. When the molecular chain length of the alkyl chain is 10 or more, the additive has an affinity for the particle surface of the pigment but has a smaller number of carboxylic acid groups for the alkyl chain. Accordingly, the additive remains at the particle surface of the pigment and cannot inhibit the rapid aggregation of the pigment when an image is formed, resulting in poor image clarity of the recorded image.

The content (ppm) of the additive in the ink is 180 ppm or more to 1,200 ppm or less with respect to the total mass of the ink. When the content of the additive is less than 180 ppm, the additive cannot sufficiently inhibit the aggregation of the pigment after the ink is applied onto the recording medium. Accordingly, the recorded image is poor in terms of image clarity. In contrast, when the content of the additive is more than 1,200 ppm, a larger amount of additive remains around the pigment particle and hinders the adsorption of the resin onto the particle surface of the pigment, inducing unstable dispersion of the pigment. Thus, the ink does not exhibit satisfactory storage stability.

Thus, in the present disclosure, it is important that the additive has a good balance between hydrophobicity and hydrophilicity, and that the content of the additive is in an appropriate range in view of the adsorption of the additive onto the pigment. In other words, the above-described resin increases the storage stability of the ink, and the above-described additive with a good balance between hydrophilicity and hydrophobicity inhibits the aggregation of the pigment after the ink is applied onto the recording medium. Thus, the storage stability of the ink and the image clarity of the recorded image can be increased to a level required in recent years.

Aqueous Ink

The ink of the present disclosure is an aqueous ink jet ink containing a pigment, a specific resin and a specific additive. Hereinafter, components constituting the ink of the present disclosure and physical properties of the ink will be described in detail.

Pigment

The ink contains a pigment as a coloring material. The content (% by mass) of the pigment in the ink is preferably 0.1% by mass or more to 15.0% by mass or less, more preferably 1.0% by mass or more to 10.0% by mass or less, with respect to the total mass of the ink.

Examples of the pigment include inorganic pigments, such as carbon black and titanium oxide; and organic pigments, such as azo compounds, phthalocyanine, quinacridone, isoindolinone, imidazolone, diketopyrrolopyrrole and dioxazine. In some embodiments, a pigment having a quinacridone skeleton, a diketopyrrolopyrrole skeleton or a perylene skeleton may be used. Although the pigment having such a skeleton tends to aggregate readily, the above-described additive inhibits the aggregation of the pigment effectively to increase the image clarity of the recorded image. When a pigment does not have any of the skeletons mentioned above, the aggregation power of the pigment to be reduced by the additive is low. Accordingly, the additive can interact with the resin rather than the pigment and thus inhibit the adsorption of the resin onto the particle surface of the pigment, slightly reducing the storage stability of the ink.

Quinacridone pigments include C.I. Pigment Violet 19 (unsubstituted quinacridone), C.I. Pigment Red 122 (2,9-dimethylquinacridone) and C.I. Pigment Red 202 (2,9-dichloroquinacridone). The quinacridone pigment may be a solid solution pigment made of two or more quinacridone pigments. For example, a solid solution pigment of C.I. Pigment Red 202 and C.I. Pigment Violet 19 or a solid solution pigment of C.I. Pigment red 122 and C.I. Pigment Violet 19 may be used. Diketopyrrolopyrrole pigments include C.I. Pigment Oranges 71 and 73; and C.I. Pigment Reds 254, 255 and 264. Perylene pigments include C.I. Pigment Orange 43 and C.I. Pigment Reds 149 and 179.

The content (% by mass) of the resin in the ink is preferably 0.15 or more to 0.30 or less in terms of mass ratio with respect to the content (% by mass) of the pigment. If this mass ratio is less than 0.15, the dispersion of the pigment may be unstable, and the ink may exhibit poor storage stability accordingly. In contrast, if this mass ratio is more than 0.30, an excess of the resin can form aggregates. Thus, the storage stability of the ink may be poor.

The pigment may be a resin-dispersed pigment in which pigment is dispersed with a resin as a dispersant (resin dispersant) or a self-dispersible pigment in which a hydrophilic group is bound to the particle surface of the pigment. Also, the pigment may be a resin-bound pigment in which an organic group containing a resin is chemically bonded to the particle surface of the pigment or a microencapsulated pigment in which the particle surface of the pigment is coated with a resin. In some embodiments, a resin-dispersed pigment in which pigment is dispersed with a resin dispersant may be used. The resin used as the dispersant for the pigment may be uncrosslinked. Two or more pigments dispersed in different manners may be used in combination.

Resin

The ink contains a resin having a unit containing a carboxylic acid group and a unit containing an aromatic group. The content (% by mass) of the resin in the ink may be 0.1% by mass or more to 5.0% by mass or less with respect to the total mass of the ink.

The resin may be added to the ink, for example, (i) to stabilize the dispersion of the pigment, that is, as a resin dispersant or its assistant for the pigment and (ii) to improve properties of the recorded image. The resin may be a block copolymer, a random copolymer, a graft copolymer or a combination of these copolymers. Also, the resin may be a water-soluble resin soluble in aqueous media or a resin particle dispersible in aqueous media. In some embodiments, the resin may be a water-soluble resin. The resin particle may not contain a coloring material.

A water-soluble resin mentioned herein implies that when the resin is neutralized with an amount of alkali equivalent to the acid value of the resin, the resin does not come into a particle state with a particle size measurable by dynamic light scattering in an aqueous medium. Whether or not the resin is soluble in aqueous media can be determined by the following method. First, a liquid containing the resin (solid resin content: 10% by mass) neutralized with an amount of alkali (for example, sodium hydroxide or potassium hydroxide) equivalent to the acid value is prepared. Then, the liquid prepared is diluted 10 times (by volume) with pure water to prepare a sample solution. If no particle with a detectable particle size is detected when the particle size of the resin in the sample solution is measured by dynamic light scattering, the resin is considered to be soluble in water. At this time, the measurement conditions may be, for example, SetZero: 30 s, number of times of measurements: 3 and measuring time: 180 s. A dynamic light scattering particle size analyzer (for example, model name UPA-EX150, manufactured by Nikkiso Co., Ltd.) may be used as the particle size distribution analyzer. However, the particle size distribution analyzer, the measuring conditions and the like are, of course, not limited to those described above.

The acid value of the resin is preferably 80 mg KOH/g or more to 250 mg KOH/g or less, more preferably 110 mg KOH/g or more to 160 mg KOH/g or less, and particularly 110 mg KOH/g or more to 145 mg KOH/g or less. The acid value of the resin can be measured in accordance with the method specified in JIS K-0070.

The weight average molecular weight of the resin is preferably 1,000 or more to 30,000 or less and more preferably 6,000 or more to 15,000 or less. The weight average molecular weight mentioned herein is the polystyrene-equivalent value measured by gel permeation chromatography (GPC). The GPC measurement may be conducted as below. The resin is added to an eluant and allowed to stand still at 25° C. for 24 hours to prepare a sample solution with the resin content (% by mass) of 0.5% by mass. The sample solution is pressure-filtered through a solvent-resistant membrane filter (pore size: 0.45 μm) before GPC measurement. For determining the molecular weight, a molecular weight calibration curve may be used.

The dispersity (Mw/Mn) of the resin, which is defined as the ratio of the weight average molecular weight (Mw) to the number average molecular weight (Mn), is preferably 3.4 or more and more preferably 3.4 or more to 5.0 or less. In general, the particle surface of the pigment is not uniform and includes portions different in physical profile or chemical structure. Accordingly, it is desirable that the resin to stabilize the dispersion of the pigment have such properties as it can accommodate such nonuniform conditions of the particle surface. A dispersity of less than 3.4 implies that the resin has a small variation in molecular weight. Thus, the particle surface of the pigment is likely to have portions with which the resin cannot easily interact, and the ink may not have sufficient storage stability. A dispersity of more than 5.0 implies that the resin has a large variation in molecular weight. Such a resin can accommodate the variation in particle surface conditions of the pigment because of its large dispersity. However, low-molecular-weight parts of the resin, which are easy to adsorb onto and desorb from the particle surface of the pigment, increase and, accordingly, may reduce the storage stability of the ink. The number average molecular weight of the resin can be determined by the same manner as the weight average molecular weight.

The resin may be acrylic resin, urethane resin or urea resin. In some embodiments, acrylic resin may be used. The resin has a unit containing a carboxylic acid group and a unit containing an aromatic group. When an acrylic resin is used, the monomer containing a carboxylic acid group may be (meth)acrylic acid, itaconic acid, maleic acid or fumaric acid, or a salt or anhydride of such an acid. Examples of the counter cation of the salt include lithium ion, sodium ion, potassium ion, ammonium ion and organic ammonium ion. In view of the compatibility between the resin and the additive, (meth)acrylic acid may be used. The monomer containing an aromatic group may be styrene, α-methylstyrene or benzyl (meth)acrylate. The resin may also have a hydrophilic unit or a hydrophobic unit in addition to the preceding units from the viewpoint of improving the adsorption of the resin onto the particle surface of the pigment and the storage stability of the ink.

The hydrophilic unit contains a hydrophilic group, such as a hydroxy group or an ethylene oxide group. The hydrophilic unit can be formed, for example, by polymerizing a hydrophilic monomer having a hydrophilic group. Examples of the hydrophilic monomer include 2-hydroxyethyl (meth) acrylate and (poly)ethylene glycol (meth)acrylate. The hydrophobic unit does not contain hydrophilic groups, such as anionic, hydroxy and ethylene oxide groups. The hydrophobic unit can be formed, for example, by polymerizing a hydrophobic monomer containing no hydrophilic group described above. Examples of the hydrophobic monomer include (meth)acrylic esters, such as ethyl (meth)acrylate, methyl (meth)acrylate, butyl (meth)acrylate and 2-ethylhexyl (meth)acrylate.

As long as the storage stability of the ink and the image clarity of the recorded image are not compromised, other resin may be added apart from the resin having the unit containing a carboxylic acid group and the unit containing an aromatic group. The ink may contain such other resin (% by mass) in a ratio of, preferably, 0.1% by mass or more to 5.0% by mass or less with respect to the total mass of the ink.

Additive

The ink contains at least one additive selected from the group consisting of butanedicarboxylic acid, pentanedicarboxylic acid, pentanetricarboxylic acid, hexanedicarboxylic acid, hexanetricarboxylic acid, heptanetricarboxylic acid, octanetricarboxylic acid and nonanetricarboxylic acid. The alkanedicarboxylic acid or alkanetricarboxylic acid added as the additive may be in an acid form or a salt form. Examples of the counter cation of the salt include lithium ion, sodium ion, potassium ion, ammonium ion and organic ammonium ion. The content (ppm) of the additive in the ink is 180 ppm or more to 1,200 ppm or less, preferably 200 ppm or more to 500 ppm or less, with respect to the total mass of the ink. Also, the content (% by mass) of the additive in the ink is preferably 3.0% by mass or more to 20.0% by mass or less and more preferably 5.0% by mass or more to 10.0% by mass or less with respect to the content (% by mass) of the resin. Additionally, the content (% by mass) of the additive in the ink is preferably 0.6% by mass or more to 4.0% by mass or less and more preferably 1.0% by mass or more to 3.0% by mass or less with respect to the content (% by mass) of the pigment.

The additive is at least one of the above cited alkanedicarboxylic acids and alkanetricarboxylic acids. Examples of butanedicarboxylic acid include 1,4-butanedicarboxylic acid (also called adipic acid), 2,4-butanedicarboxylic acid (also called 2-methylglutaric acid) and 2,3-butanedicarboxylic acid. Examples of pentanedicarboxylic acid include 1,4-pentanedicarboxylic acid, 2,4-pentanedicarboxylic acid and 2-methyl-2,4-pentanedicarboxylic acid (also called 2,2,4-trimethylglutaric acid) Examples of pentanetricarboxylic acid include 1,3,6-pentanetricarboxylic acid, 2,3,5-pentanetricarboxylic acid and 3-methyl-1,3,4-pentanetricarboxylic acid. Hexanedicarboxylic acid may be 2,5-hexanedicarboxylic acid (also called 2,5-dimethyladipic acid). Examples of hexanetricarboxylic acid include 1,3,5-hexanetricarboxylic acid, 1,4,5-hexanetricarboxylic acid, 3-methyl-2,3,5-hexanetricarboxylic acid, 5-methyl-1,3,5-hexanetricarboxylic acid, 5-methyl-1,4,5-hexanetricarboxylic acid, 3-methyl-1,3,6-hexanetricarboxylic acid and 3,5-dimethyl-1,3,5-hexanetricarboxylic acid. Examples of heptanetricarboxylic acid include 1,4,6-heptanetricarboxylic acid, 2,4,6-heptanetricarboxylic acid and 2,4-dimethyl-2,4,6-heptanetricarboxylic acid. Octanetricarboxylic acid may be 1,2,8-octanetricarboxylic acid. Nonanetricarboxylic acid may be 2,5,8-nonanetricarboxylic acid.

In view of the image clarity of the recorded image, the alkyl chain of the additive is desirably short. Such an additive has a high carboxylic acid group density and can inhibit aggregation effectively. In contrast, in view of the storage stability of the ink, the alkyl chain of the additive is desirably long. Such an additive is effective in stabilizing the dispersion because of the repulsion produced by the steric barrier. From the balance between these two points of view, in some embodiments, the molecular chain length of the alkyl chain is 6; hence, hexanedicarboxylic acid or hexanetricarboxylic acid is used. In some embodiments, a hexanetricarboxylic acid having a structure formed by polymerizing three acrylic acids may be used, and the structure may contain one methacrylic acid. Examples of such an additive include 1,3,5-hexanetricarboxylic acid, 1,4,5-hexanetricarboxylic acid, 3-methyl-2,3,5-hexanetricarboxylic acid, 5-methyl-1,3,5-hexanetricarboxylic acid, 5-methyl-1,4,5-hexanetricarboxylic acid and 3-methyl-1,3,6-hexanetricarboxylic acid.

Aqueous Medium

The ink of the present disclosure is an aqueous ink containing water as an aqueous medium. The ink may contain water or a mixed solvent of water and a water-soluble organic solvent. The water may be deionized water (ion exchanged water). The content (% by mass) of the water in the ink is preferably 50.0% by mass or more to 95.0% by mass or less with respect to the total mass of the ink.

The water-soluble organic solvent is soluble in water (desirably, capable of dissolving in water in a desired proportion at 25° C.) and is not otherwise limited. Specific examples of the water-soluble organic solvent include monohydric or polyhydric alcohols, alkylene glycols, glycol ethers, nitrogen-containing polar compounds and sulfur-containing polar compounds. The content (% by mass) of the water-soluble organic solvent in the ink is preferably 5.0% by mass or more to 90.0% by mass or less, more preferably 10.0% by mass or more to 50.0% by mass or less, with respect to the total mass of the ink.

Other Additives

The ink may optionally contain further additives other than the above-described additive, and such further additives include a surfactant, a pH adjuster, a rust preventive, a preservative, a fungicide, an antioxidant, an antireductant, an evaporation promoter and a chelating agent. In some embodiments, the ink contains a surfactant. The content (% by mass) of the surfactant in the ink is preferably 0.1% by mass or more to 5.0% by mass or less, more preferably 0.1% by mass or more to 2.0% by mass or less, with respect to the total mass of the ink. The surfactant may be anionic, cationic or nonionic.

Preparation of Ink

An unreacted monomer remaining without reacting when the resin is synthesized, or a residue of a polymerization initiator generally used in the synthesis may be mixed into the ink together with the resin and contaminate the ink. The ink may be purified in the preparation process to reduce the effect of the polymerization initiator and the unreacted monomer on the ink properties. For the purification, the ink may be subjected to ultrafiltration or precipitation. For the purification by ultrafiltration, an ultrafiltration membrane with a molecular weight cut-off of 10 kDa or more to 80 kDa or less, particularly 10 kDa or more to 70 kDa or less, may be used in view of easy removal of the polymerization initiator and unreacted monomer. For the purification by precipitation, an organic solvent such as methanol or hexane may be added to the resin (or liquid containing the resin) to precipitate the resin, and the precipitated resin is collected. In some embodiments, the solvent used for the precipitation may be methanol in view of the water solubility of the resin. The solvent is added in an excessive amount to precipitate the resin and may be added, for example, 5 times or more to 20 times or less in terms of mass ratio with respect to the content of the resin.

Physical Properties of Ink

The ink disclosed herein is used for an ink jet recording method, and the properties of the ink may be controlled appropriately to the ink jet method. The surface tension of the ink at 25° C. is preferably 10 mN/m or more to 60 mN/m or less and more preferably 20 mN/m or more to 40 mN/m or less. The viscosity of the ink at 25° C. is preferably 1.0 mPa·s or more to 10.0 mPa·s or less. The pH of the ink at 25° C. is preferably 5.0 or more to 10.0 or less and more preferably 6.0 or more to 8.5 or less.

Ink Cartridge

Figure 1:
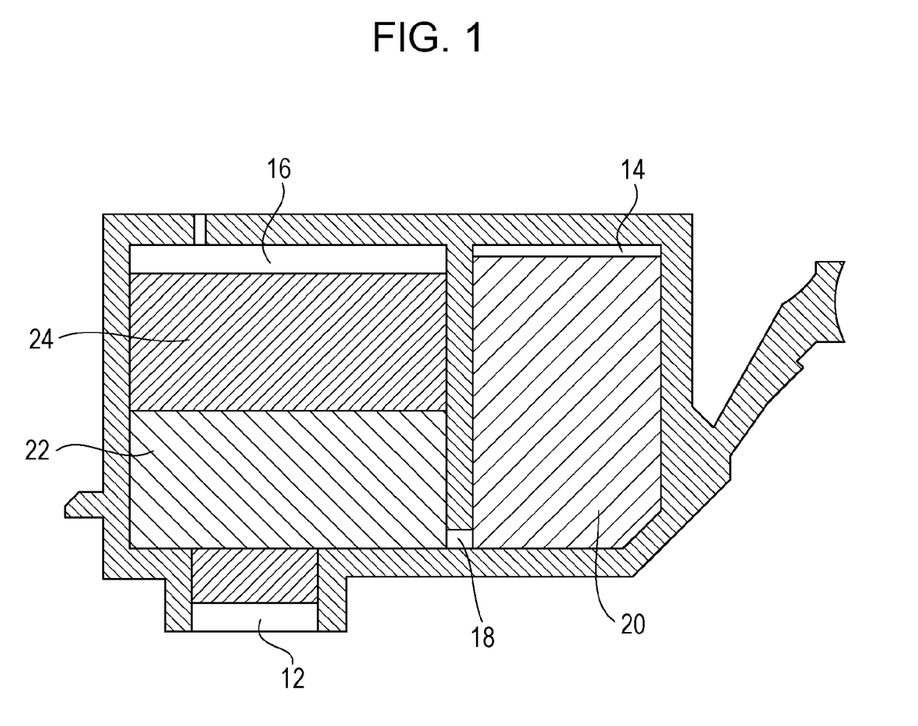
FIG. 1 is a cross-sectional view schematically illustrating an exemplary embodiment of an ink cartridge of the present disclosure.

An ink cartridge disclosed herein includes an ink and an ink storage portion that stores the ink. The ink in the ink storage portion is the above-described aqueous ink according to an embodiment of the present disclosure. FIG. 1 is a cross-sectional view schematically illustrating an exemplary embodiment of an ink cartridge of the present disclosure. As depicted in FIG. 1, the ink cartridge has, at the bottom of the cartridge, an ink supply port 12 through which the ink is supplied to a recording head. The interior of the ink cartridge functions as the ink storage portion to contain the ink. The ink storage portion includes an ink storage chamber 14 and an absorber storage chamber 16 that are connected through a connection port 18. The absorber storage chamber 16 communicates with the ink supply port 12. The ink storage chamber 14 contains a liquid ink 20, and the absorber storage chamber 16 contains absorbers 22 and 24 that hold the ink in a state being impregnated with the ink. The ink storage portion may be such that one or more absorbers hold the entirety of the ink contained therein without having an ink storage chamber to accommodate liquid ink. Also, the ink storage portion may be such that it can hold the entire ink in a liquid form without having absorbers. The ink cartridge may have a structure including an ink storage portion and a recording head.

Ink Jet Recording Method

In the ink jet recording method disclosed herein, the above-described aqueous ink according to an embodiment of the present disclosure is ejected from an ink jet recording head to record an image on a recording medium. For ejecting the ink, mechanical energy or thermal energy may be applied to the ink. In some embodiments, the ink is ejected by applying thermal energy to the ink. Steps of known ink jet recording methods can be applied to the recording method disclosed herein, except for using the ink disclosed herein. The method disclosed herein does not require the operation of applying heat or pressure to the image or irradiating the image with active energy rays, such as ultraviolet rays after applying the ink.

Figure 2A:
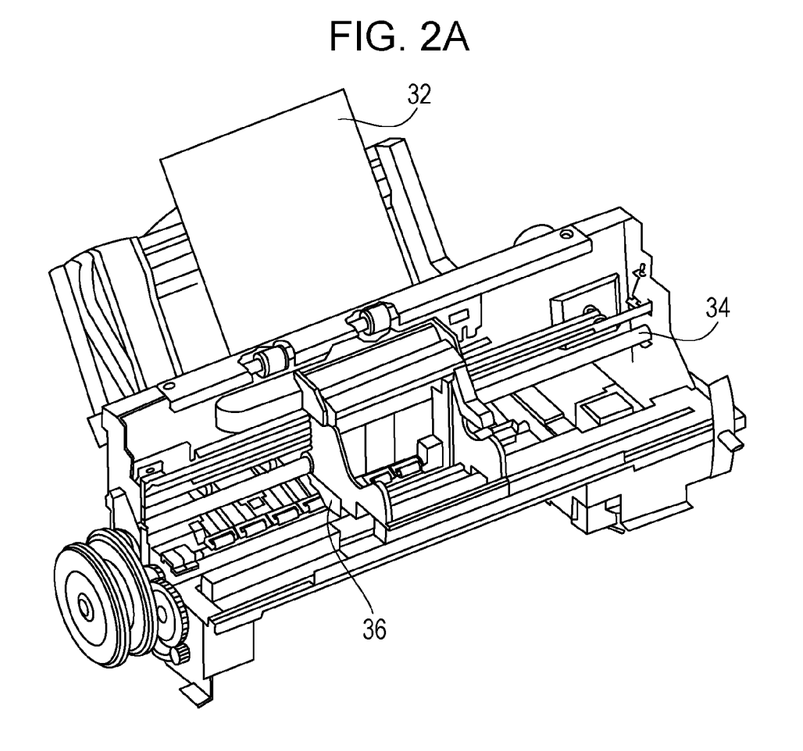
FIG. 2A is a perspective view schematically illustrating an example of a principal part of an ink jet recording apparatus used in an ink jet recording method according to the present disclosure.
Figure 2B:
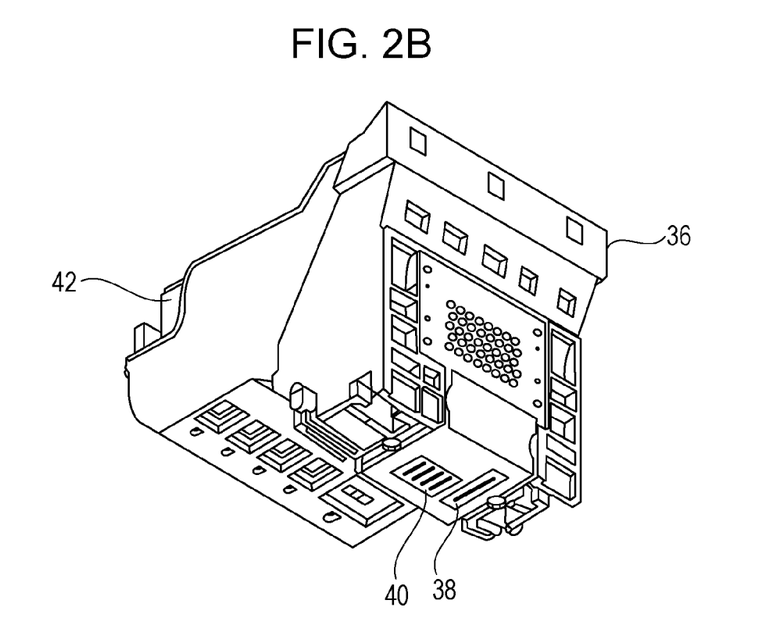
FIG. 2B is a perspective view schematically illustrating an example of a head cartridge used in an ink jet recording method according to the present disclosure.

FIGS. 2A and 2B are views schematically illustrating an example of an ink jet recording apparatus used in the ink jet recording method of the present disclosure. FIG. 2A is a perspective view of a principal part of the ink jet recording apparatus and FIG. 2B is a perspective view illustrating a head cartridge. This ink jet recording apparatus includes a conveyance unit (not shown) to convey a recording medium 32 and a carriage shaft 34. A head cartridge 36 is mountable on the carriage shaft 34. The head cartridge 36 includes recording heads 38 and 40, and an ink cartridge 42 is set to the head cartridge 36. While the head cartridge 36 moves in the main scanning direction along the carriage shaft 34, the recording heads 38 and 40 eject ink (not shown) onto the recording medium 32. The recording medium 32 is then conveyed in the sub-scanning direction by the conveyance unit (not shown). An image is thus recorded on the recording medium 32.

EXAMPLES

Hereinafter, the present disclosure will be described in more detail by way of Examples and Comparative Examples. However, the present disclosure is not intended to be limited to the following examples as long as the present disclosure does not depart from its gists. In the following description, "part(s)" and "%" expressed for constituent amounts are on a mass basis unless otherwise specified.

Analysis of Resin

Weight Average Molecular Weight and Number Average Molecular Weight

A weight average molecular weight (Mw) of the resin and a number average molecular weight (Mn) of the resin, presented as polystyrene-equivalent values, were measured by gel permeation chromatography (GPC). More specifically, the GPC was conducted under the following conditions.

Analyzer: Molecular weight analyzer, model name "Waters ALLIANCE e2695" manufactured by Waters Corporation.

Column: Combination of Asahipak "GF-1G 7B" (Guard Column), "GF-310 HQ" and "GF-510 HQ" (both model names, manufactured by Showa Denko K.K.) connected in series Eluent: 20 mmol/L solution of lithium bromide in N,N-dimethylformamide Flow rate: 0.6 mL/min Sample injection volume: 0.100 mL Oven temperature: 40° C.

Detector: Refractive index (RI) detector: trade name "Wyatt Optilab rex" manufactured by Wyatt Technology Corporation.

For determining the molecular weight, a molecular weight calibration curve created using a molecular weight standard "EasiCal Type PS-2 Polystyrene" (trade name) manufactured by Agilent Technologies, Inc. was used.

Acid Value

The acid value of the resin was measured by a titration method in accordance with JIS K-0070. The resin was weighed out 0.5 g to 2.0 g as a sample to be measured. The sample was placed into a 50.0 ml beaker, and 25.0 mL of a mixture of tetrahydrofuran and ethanol (in a volume ratio of 2:1) was added to dissolve the sample. Potentiometric titration was performed using a 0.1 mol/L solution of potassium hydroxide in ethanol as the titrant. The volume of the titrant dropped is represented by S (mL). A blank sample containing no measurement target was also subjected to titration. The volume of the titrant dropped at this time is represented by B (mL). An automatic titrator, model name COM-2500 manufactured by HIRANUMA Co., Ltd., was used for the measurement. The acid value was calculated using the following equation from the volumes (S and B) of titrant. In the equation, f represents the factor of the solution of potassium hydroxide in ethanol (titrant), and M (g) represents the weight of the sample accurately measured.

Acid value [mg KOH/g]=(S−B)×f×5.61/M

Synthesis of Resin

A solvent (200.0 parts of methyl ethyl ketone) in a flask equipped with a stirrer, a nitrogen inlet tube, a reflux condenser and a thermometer was heated to 78° C. in a nitrogen atmosphere with stirring. A polymerization initiator (2,2'-azobis(2-methylbutyronitrile)) in an amount presented in Table 1 was dissolved in 20.0 parts of methyl ethyl ketone to prepare a polymerization initiator solution. Monomers presented in Table 1 and the polymerization initiator solution were each dropped into the flask over a period of 2 hours with the temperature kept at 78° C. Each resin was thus synthesized with stirring for 4 hours in the reaction system kept at 78° C. The resulting resins were all soluble in water. Then, all resins except resin 4 were purified by the treatment (precipitation or ultrafiltration) presented in Table 1.

resents methyl methacrylate; and HEMA represents 2-hydroxyethyl methacrylate. Table 1 also presents the weight average molecular weight (Mw), number average molecular weight (Mn), dispersity (Mw/Mn) and acid value of each resin.

TABLE 1

Synthesizing Conditions and Properties of Resins

| Resin-containing liquid | Monomer (parts) | | | | | | | | Polymerization initiator (parts) | Purification treatment | Resin properties | | | |
|---|---|---|---|---|---|---|---|---|---|---|---|---|---|---|
| | St | αMSt | nBA | MMA | CHMA | AA | MAA | HEMA | | | Mw | Mn | Dispersity (Mw/Mn) | Acid value (mg KOH/g) |
| 1 | 50.0 | | 30.0 | | | 20.0 | | | 6.0 | Precipitation | 9,000 | 2,432 | 3.7 | 140 |
| 2 | 50.0 | | 30.0 | | | 20.0 | | | 6.0 | Ultrafiltration (10 kD) | 9,000 | 2,727 | 3.3 | 140 |
| 3 | 50.0 | | 30.0 | | | 20.0 | | | 6.0 | Ultrafiltration (70 kD) | 9,000 | 2,647 | 3.4 | 140 |
| 4 | 50.0 | | 30.0 | | | 20.0 | | | 6.0 | Unpurified | 9,000 | 2,571 | 3.5 | 140 |
| 5 | 50.0 | | 30.0 | | | 20.0 | | | 10.0 | Precipitation | 5,500 | 1,486 | 3.7 | 140 |
| 6 | 50.0 | | 30.0 | | | 20.0 | | | 9.0 | Precipitation | 6,000 | 1,622 | 3.7 | 140 |
| 7 | 50.0 | | 30.0 | | | 20.0 | | | 4.0 | Precipitation | 15,000 | 4,054 | 3.7 | 140 |
| 8 | 50.0 | | 30.0 | | | 20.0 | | | 3.5 | Precipitation | 16,000 | 4,324 | 3.7 | 140 |
| 9 | 56.5 | | 30.0 | | | 13.5 | | | 6.0 | Precipitation | 9,000 | 2,432 | 3.7 | 100 |
| 10 | 55.0 | | 30.0 | | | 15.0 | | | 6.0 | Precipitation | 9,000 | 2,432 | 3.7 | 110 |
| 11 | 48.5 | | 30.0 | | | 21.5 | | | 6.0 | Precipitation | 9,000 | 2,432 | 3.7 | 160 |
| 12 | 47.0 | | 30.0 | | | 23.0 | | | 6.0 | Precipitation | 9,000 | 2,432 | 3.7 | 170 |
| 13 | 50.0 | 30.0 | | | | 20.0 | | | 6.0 | Precipitation | 9,000 | 2,432 | 3.7 | 140 |
| 14 | 50.0 | | | 30.0 | | 20.0 | | | 6.0 | Precipitation | 9,000 | 2,432 | 3.7 | 140 |
| 15 | 50.0 | | | | 30.0 | 20.0 | | | 6.0 | Precipitation | 9,000 | 2,432 | 3.7 | 140 |
| 16 | 50.0 | | | | | 20.0 | 30.0 | | 6.0 | Precipitation | 9,000 | 2,432 | 3.7 | 140 |
| 17 | 50.0 | | 30.0 | | | | 20.0 | | 6.0 | Precipitation | 9,000 | 2,432 | 3.7 | 130 |
| 18 | 53.0 | | 30.0 | | | 13.5 | | | 3.5 | Ultrafiltration (10 kD) | 16,000 | 4,848 | 3.3 | 100 |
| 19 | 50.0 | | | | | | | 50.0 | 6.0 | Precipitation | 9,000 | 2,432 | 3.7 | 0 |
| 20 | | | 30.0 | 50.0 | | 20.0 | | | 6.0 | Precipitation | 9,000 | 2,432 | 3.7 | 140 |

The purification treatment by ultrafiltration was performed according to the following procedure. After the synthesis of each resin, potassium hydroxide in an amount by mole equivalent to 0.9 time the acid value of the resin and an appropriate amount of ion-exchanged water were added into the flask, followed by removing methyl ethyl ketone under reduced pressure. Ultrafiltration was then performed in combination with a diafiltration method. A modified polyethersulfone hollow fiber module MicroKross (trade name), manufactured by Spectrum Laboratories, Inc., with a molecular weight cut-off of 70 kDa or 10 kDa was used as the ultrafiltration membrane. Then, an appropriate amount of ion-exchanged water was added to yield a liquid containing 20.0% of the resin.

The purification treatment by precipitation was performed according to the following procedure. After the synthesis of each resin, methyl ethyl ketone was removed under reduced pressure, and the residue was removed from the flask and added to methanol in an amount by mass of 10 times the resin to precipitate the resin. The resin was collected as a precipitate and dried. Then, potassium hydroxide in an amount by mole equivalent to 0.9 time the acid value of the resin and an appropriate amount of ion-exchanged water were added to yield a liquid containing 20.0% of the resin.

Abbreviations of the monomers in Table 1 are as follows: St represents styrene; aMSt represents α-methylstyrene; nBA represents n-butyl acrylate; CHMA represents cyclohexyl methacrylate; AA represents acrylic acid; MMA represents methyl methacrylate; and HEMA represents 2-hydroxyethyl methacrylate.

Synthesis of Urethane Resin

A urethane resin was synthesized as described below in accordance with the process for synthesizing water-soluble urethane resin described in Japanese Patent Laid-Open No. 2021-008563. A mixture of 35.3 parts of isophorone diisocyanate, 50.4 parts of polypropylene glycol (number average molecular weight: 2,000), 12.1 parts of dimethylolpropionic acid and 200.0 parts of methyl ethyl ketone was prepared. The mixture was placed into a flask equipped with a stirrer, a nitrogen inlet tube, a reflux condenser and a thermometer and subjected to a reaction at 80° C. for 6 hours. Then, 2.2 parts of dimethylolpropionic acid, 0.60 part of ethylenediamine as a chain extending agent and 100.0 parts of methyl ethyl ketone were added. While the percentage of the isocyanate group remaining was checked by FT-IR, the reaction was continued until the isocyanate group was reduced to 15% to obtain a reaction liquid. After the reaction liquid was cooled to 40° C., an appropriate amount of ion-exchanged water was added to the reaction liquid, and potassium hydroxide was added in an amount by mole equivalent to 1.0 time the acid value of the resin with high-speed agitation with a homomixer. After methyl ethyl ketone was removed under reduced pressure, an appropriate amount of ion-exchanged water was added to yield a liquid containing 20.0% of a water-soluble urethane resin. The urethane resin had an acid value of 60 mg KOH/g and a weight average molecular weight of 15,000.

Preparation of Pigment Dispersion Liquid

Pigment Dispersion Liquids 1 to 14, 16 to 25 and 27 to 34

Constituents presented on the left side of Table 2 were mixed and dispersed in each other 10 passes at a treatment pressure of 150 MPa with a high-pressure homogenizer "Star Burst" (trade name), manufactured by Sugino Machine Limited. Then, coarse particles were removed by centrifugation at a rotational speed of 10,000 rpm for 10 minutes. The dispersion liquid was pressure-filtered through a polypropylene filter with a pore size of 1.0 μm (manufactured by F-tech Separation & Filtration), and, if necessary, an appropriate amount of ion-exchanged water was added. Each dispersion liquid was thus prepared. The solid solution pigment of pigment dispersion liquid 3 was a solid solution of C.I. Pigment Red 202 and C.I. Pigment Violet 19. In Table 2, the resin content in each pigment dispersion liquid is that of the resin having a unit containing a carboxylic acid group and a unit containing an aromatic group. For pigment dispersion liquid 32, the pigment formed aggregates, and, therefore, "-" is indicated in the property cells in Table 2.

Pigment Dispersion Liquid 15

A commercially available pigment dispersion liquid "Cab-O-Jet 400" (trade name), produced by Cabot Corporation, was concentrated to half volume by heating to prepare a concentrate containing 30.0% of a self-dispersible pigment. The commercially available pigment dispersion liquid is a dispersion of a self-dispersible pigment in water. This self-dispersible pigment has a particle surface to which an atomic group including an anionic group is bound, and the pigment content of the dispersion liquid is 15.0%. Pigment dispersion liquid 15 was prepared by mixing 50.0 parts of the resulting concentrate, 15.0 parts of the resin 4-containing liquid and 35.0 parts of ion-exchanged water. Pigment dispersion liquid 15 had a pigment content of 15.0% and a resin content of 3.0%.

Pigment Dispersion Liquid 26

Pigment dispersion liquid 26 was prepared in the same manner as pigment dispersion liquid 1, except that a 1:1 mixture of the resin 6-containing liquid and the resin 7-containing liquid was used as the resin-containing liquid. Pigment dispersion liquid 26 had a pigment content of 15.0% and a resin content of 3.0%. The dispersity of the resin in the 1:1 mixture of the resin 6-containing liquid and the resin 7-containing liquid was 5.0.

Pigment Dispersion Liquid 35

Pigment dispersion liquid 35 was prepared in the same manner as pigment dispersion liquid 15, except for using the resin 1-containing liquid. Pigment dispersion liquid 35 had a pigment content of 15.0% and a resin content of 3.0%.

TABLE 2

Preparation and Properties of Pigment Dispersion Liquids

| | | Composition of pigment dispersion liquid | | | | | Properties | | |
|---|---|---|---|---|---|---|---|---|---|
| | | Pigment | | Resin-containing liquid | | Ion-exchanged water | | | |
| | | Name | Amount (parts) | Resin | Amount (parts) | Amount (parts) | Pigment content P (%) | Resin content R (%) | R/P (times) |
| Pigment dispersion liquid | 1 | C.I. Pigment Red 122 | 15.00 | 1 | 15.00 | 70.00 | 15.00 | 3.00 | 0.20 |
| | 2 | C.I. Pigment Violet 19 | 15.00 | 1 | 15.00 | 70.00 | 15.00 | 3.00 | 0.20 |
| | 3 | Solid solution pigment | 15.00 | 1 | 15.00 | 70.00 | 15.00 | 3.00 | 0.20 |
| | 4 | C.I. Pigment Red 254 | 15.00 | 1 | 15.00 | 70.00 | 15.00 | 3.00 | 0.20 |
| | 5 | C.I. Pigment Orange 43 | 15.00 | 1 | 15.00 | 70.00 | 15.00 | 3.00 | 0.20 |
| | 6 | C.I. Pigment Red 122 | 15.00 | 13 | 15.00 | 70.00 | 15.00 | 3.00 | 0.20 |
| | 7 | C.I. Pigment Red 122 | 15.00 | 14 | 15.00 | 70.00 | 15.00 | 3.00 | 0.20 |
| | 8 | C.I. Pigment Red 122 | 15.00 | 15 | 15.00 | 70.00 | 15.00 | 3.00 | 0.20 |
| | 9 | C.I. Pigment Red 122 | 15.00 | 16 | 15.00 | 70.00 | 15.00 | 3.00 | 0.20 |
| | 10 | C.I. Pigment Red 122 | 15.00 | 17 | 15.00 | 70.00 | 15.00 | 3.00 | 0.20 |
| | 11 | C.I. Pigment Red 122 | 15.00 | 1 | 11.25 | 62.50 | 15.00 | 2.25 | 0.15 |
| | | | | Urethane resin | 11.25 | | | | |
| | 12 | C.I. Pigment Blue 15:3 | 15.00 | 1 | 15.00 | 70.00 | 15.00 | 3.00 | 0.20 |
| | 13 | C.I. Pigment Yellow 74 | 15.00 | 1 | 15.00 | 70.00 | 15.00 | 3.00 | 0.20 |
| | 14 | Carbon black | 15.00 | 1 | 15.00 | 70.00 | 15.00 | 3.00 | 0.20 |
| | 16 | C.I. Pigment Red 122 | 15.00 | 1 | 10.50 | 74.50 | 15.00 | 2.10 | 0.14 |
| | 17 | C.I. Pigment Red 122 | 15.00 | 1 | 11.25 | 73.75 | 15.00 | 2.25 | 0.15 |
| | 18 | C.I. Pigment Red 122 | 15.00 | 1 | 22.50 | 62.50 | 15.00 | 4.50 | 0.30 |
| | 19 | C.I. Pigment Red 122 | 15.00 | 1 | 23.25 | 61.75 | 15.00 | 4.65 | 0.31 |
| | 20 | C.I. Pigment Red 122 | 15.00 | 5 | 15.00 | 70.00 | 15.00 | 3.00 | 0.20 |
| | 21 | C.I. Pigment Red 122 | 15.00 | 6 | 15.00 | 70.00 | 15.00 | 3.00 | 0.20 |
| | 22 | C.I. Pigment Red 122 | 15.00 | 7 | 15.00 | 70.00 | 15.00 | 3.00 | 0.20 |
| | 23 | C.I. Pigment Red 122 | 15.00 | 8 | 15.00 | 70.00 | 15.00 | 3.00 | 0.20 |
| | 24 | C.I. Pigment Red 122 | 15.00 | 2 | 15.00 | 70.00 | 15.00 | 3.00 | 0.20 |
| | 25 | C.I. Pigment Red 122 | 15.00 | 3 | 15.00 | 70.00 | 15.00 | 3.00 | 0.20 |
| | 26 | C.I. Pigment Red 122 | 15.00 | 6 | 7.50 | 70.00 | 15.00 | 3.00 | 0.20 |
| | | | | 7 | 7.50 | | | | |
| | 27 | C.I. Pigment Red 122 | 15.00 | 9 | 15.00 | 70.00 | 15.00 | 3.00 | 0.20 |
| | 28 | C.I. Pigment Red 122 | 15.00 | 10 | 15.00 | 70.00 | 15.00 | 3.00 | 0.20 |
| | 29 | C.I. Pigment Red 122 | 15.00 | 11 | 15.00 | 70.00 | 15.00 | 3.00 | 0.20 |
| | 30 | C.I. Pigment Red 122 | 15.00 | 12 | 15.00 | 70.00 | 15.00 | 3.00 | 0.20 |
| | 31 | Carbon black | 15.00 | 18 | 23.25 | 61.75 | 15.00 | 4.65 | 0.31 |
| | 32 | C.I. Pigment Red 122 | 15.00 | 19 | 15.00 | 70.00 | — | — | — |
| | 33 | C.I. Pigment Red 122 | 15.00 | 20 | 15.00 | 70.00 | 15.00 | 0.00 | 0.00 |
| | 34 | Carbon black | 15.00 | 1 | 15.00 | 70.00 | 15.00 | 3.00 | 0.20 |

Preparation of Ink

The constituents presented below were mixed and sufficiently stirred. The resulting mixture was subjected to pressure filtration through a microfilter with a pore size of 1.2 μm (manufactured by Sartorius AG), thus preparing each ink. Additives used in the inks are presented in Table 3. Acetylenol E100 (trade name) is a nonionic surfactant produced by Kawaken Fine Chemicals Co., Ltd.

Pigment dispersion liquid presented in Table 4 or 5: 20.0%
Additive presented in Table 4 or 5: amount (ppm) presented in Table 4 or 5
Glycerin: 5.0%
Triethylene glycol: 10.0%
Acetylenol E100: 0.1%
1,2-Hexanediol: 2.0%
Ion-exchanged water: amount to balance the total of the constituents to 100.0%

TABLE 3

Additives

| Additive | Compound name | Molecular chain length of alkyl chain | Number of carboxylic acid groups |
|---|---|---|---|
| 1 | 1,3,5-Hexanetricarboxylic acid | 6 | 3 |
| 2 | 1,4,5-Hexanetricarboxylic acid | 6 | 3 |
| 3 | 3-Methyl-2,3,5-hexanetricarboxylic acid | 6 | 3 |
| 4 | 5-Methyl-1,3,5-hexanetricarboxylic acid | 6 | 3 |
| 5 | 5-Methyl-1,4,5-hexanetricarboxylic acid | 6 | 3 |
| 6 | 3-Methyl-1,3,6-hexanetricarboxylic acid | 6 | 3 |
| 7 | 3,5-Dimethyl-1,3,5-hexanetricarboxylic acid | 6 | 3 |
| 8 | 1,4-Butanedicarboxylic acid (Adipic acid) | 4 | 2 |
| 9 | 2,4-Butanedicarboxylic acid (2-Methylglutaric acid) | 4 | 2 |
| 10 | 2,3-Butanedicarboxylic acid | 4 | 2 |
| 11 | 2-Methyl-2,3-butanedicarboxylic acid | 4 | 2 |
| 12 | 2,2,3,3-Tetramethylbutanedicarboxylic acid | 4 | 2 |
| 13 | 3-Methyl-1,3-butanedicarboxylic acid | 4 | 2 |
| 14 | 2,4-Pentanedicarboxylic acid | 5 | 2 |
| 15 | 1,4-Pentanedicarboxylic acid | 5 | 2 |
| 16 | 2-Methyl-2,4-pentanedicarboxylic acid (2,2,4-trimethylglutaric acid) | 5 | 2 |
| 17 | 3-Methyl-1,3,4-pentanetricarboxylic acid | 5 | 3 |
| 18 | 3-Methyl-2,3,4-pentanetricarboxylic acid | 5 | 3 |
| 19 | 1,3,6-Pentanetricarboxylic acid | 5 | 3 |
| 20 | 2,3,5-Pentanetricarboxylic acid | 5 | 3 |
| 21 | 3,4-Dimethyl-1,3,4-pentanetricarboxylic acid | 5 | 3 |
| 22 | 2,5-Hexanedicarboxylic acid (2,5-Dimethyladipic acid) | 6 | 2 |
| 23 | 4-(Carboxymethyl)heptanedicarboxylic acid | 7 | 2 |
| 24 | 2,4-Dimethyl-2,4,6-heptanetricarboxylic acid | 7 | 3 |
| 25 | 2,3,6-Heptanetricarboxylic acid | 7 | 3 |
| 26 | 1,4,6-Heptanetricarboxylic acid | 7 | 3 |
| 27 | 2,4,6-Heptanetricarboxylic acid | 7 | 3 |
| 28 | 2,5,8-Nonanetricarboxylic acid | 9 | 3 |
| 29 | Citric acid | 3 | 3 |
| 30 | Succinic acid | 2 | 2 |
| 31 | Acetic acid | 1 | 1 |
| 32 | 1,6,12-Dodecanetricarboxylic acid | 12 | 3 |
| 33 | 1,2,3,4-Butanetetracarboxylic acid | 4 | 4 |
| 34 | Sodium maleate | — | 2 |
| 35 | Potassium phthalate | — | 2 |
| 36 | Ethylenediaminetetraacetic acid (EDTA) | — | 4 |

Evaluation

The following properties of each ink prepared above were evaluated. For rating for the evaluation, "AA", "A" and "B" represent acceptable levels, and "C" represents an unacceptable level in the present disclosure. In Comparative Example 1, the pigment formed aggregates during the preparation of the ink, and the evaluation results are indicated as "N/A". The evaluation results are presented on the right side of Tables 4 and 5. In Tables 4 and 5, the "Resin content" is that of the resin having a unit containing a carboxylic acid group and a unit containing an aromatic group.

Storage Stability

The particle size of the pigment in each prepared ink was measured ("particle size before storage"). The ink was stored in a sealed container at 80° C. for 4 days. After the ink was cooled to 25° C., the particle size of the pigment was measured again ("particle size after storage"). The particle size of the pigment is the D50 particle size that is the value at 50% in a cumulative volume distribution measured by dynamic light scattering with a particle size analyzer, model name "UPA-EX150" manufactured by Nikkiso Co., Ltd. The storage stability of the inks was evaluated according to the following criteria based on the difference in particle size calculated using the equation: "difference in particle size (nm)="particle size after storage"−"particle size before storage".

AA: The difference in particle size of the ink was 10 nm or less.
A: The difference in particle size of the ink was more than 10 nm to 20 nm or less.
B: The difference in particle size of the ink was more than 20 nm to 30 nm or less.
C: The difference in particle size of the ink was more than 30 nm.

Image Clarity

An ink cartridge charged with any of the inks was mounted in an ink jet recording apparatus, model name "PIXUS Pro 9500" manufactured by Canon Inc., configured to eject ink from the recording head by using thermal energy. In the Examples, the record duty of a solid image recorded in such a manner that 28 ng of ink is applied onto a unit area of 1/600 in.×1/600 in. is defined as 100%. A solid image with a record duty of 100% was recorded on the entire surface of an A4 recording medium (photo paper "Canon Photo Paper, Glossy Gold GL-101" (trade name), manufactured by Canon Inc.). After being dried at 25° C. for 24 hours, the image was irradiated with light emitted from a distance of 2 m at an angle of 45 degrees, using two fluorescent lamps placed in parallel at an interval of 10 cm (illumination angle: 45 degrees) as the light source for observation. The shape of the fluorescent lamps was projected on the recorded image, and the projected shape on the recorded image was visually observed at an angle of 45 degrees (observation angle: 45 degrees) for the evaluation of the image clarity.

A: The boundary between the two fluorescent lamps of the projected image was apparent, and no blurring was observed at the edges of the boundary.

B: The boundary between the two fluorescent lamps of the projected image was apparent, but blurring was slightly observed at the edges of the boundary.

C: The boundary between the two fluorescent lamps of the projected image was invisible.

TABLE 4

Composition, Properties and Evaluation Results of Inks

| | | Composition | | Properties | | | | Evaluation result | |
|---|---|---|---|---|---|---|---|---|---|
| | | Pigment dispersion liquid Kind | Additive Kind | Pigment content P(%) | Resin content R(%) | R/P (times) | Specific additive content (ppm) | Storage stability | Image clarity |
| | | | Amount (ppm) | | | | | | |
| Example | 1 | 1 | 1 | 300 | 3.00 | 0.60 | 0.20 | 300 | AA | A |
| | 2 | 2 | 1 | 300 | 3.00 | 0.60 | 0.20 | 300 | AA | A |
| | 3 | 3 | 1 | 300 | 3.00 | 0.60 | 0.20 | 300 | AA | A |
| | 4 | 4 | 1 | 300 | 3.00 | 0.60 | 0.20 | 300 | AA | A |
| | 5 | 5 | 1 | 300 | 3.00 | 0.60 | 0.20 | 300 | AA | A |
| | 6 | 1 | 2 | 300 | 3.00 | 0.60 | 0.20 | 300 | AA | A |
| | 7 | 1 | 3 | 300 | 3.00 | 0.60 | 0.20 | 300 | AA | A |
| | 8 | 1 | 4 | 300 | 3.00 | 0.60 | 0.20 | 300 | AA | A |
| | 9 | 1 | 5 | 300 | 3.00 | 0.60 | 0.20 | 300 | AA | A |
| | 10 | 1 | 6 | 300 | 3.00 | 0.60 | 0.20 | 300 | AA | A |
| | 11 | 1 | 1 | 180 | 3.00 | 0.60 | 0.20 | 180 | AA | A |
| | 12 | 1 | 1 | 1,200 | 3.00 | 0.60 | 0.20 | 1,200 | AA | A |
| | 13 | 6 | 1 | 300 | 3.00 | 0.60 | 0.20 | 300 | AA | A |
| | 14 | 7 | 1 | 300 | 3.00 | 0.60 | 0.20 | 300 | AA | A |
| | 15 | 8 | 1 | 300 | 3.00 | 0.60 | 0.20 | 300 | AA | A |
| | 16 | 9 | 1 | 300 | 3.00 | 0.60 | 0.20 | 300 | AA | A |
| | 17 | 10 | 1 | 300 | 3.00 | 0.60 | 0.20 | 300 | AA | A |
| | 18 | 11 | 1 | 300 | 3.00 | 0.45 | 0.15 | 300 | AA | A |
| | 19 | 1 | 8 | 300 | 3.00 | 0.60 | 0.20 | 300 | B | A |
| | 20 | 1 | 9 | 300 | 3.00 | 0.60 | 0.20 | 300 | B | A |
| | 21 | 1 | 10 | 300 | 3.00 | 0.60 | 0.20 | 300 | B | A |
| | 22 | 1 | 11 | 300 | 3.00 | 0.60 | 0.20 | 300 | B | A |
| | 23 | 1 | 12 | 300 | 3.00 | 0.60 | 0.20 | 300 | B | A |
| | 24 | 1 | 13 | 300 | 3.00 | 0.60 | 0.20 | 300 | B | A |
| | 25 | 1 | 14 | 300 | 3.00 | 0.60 | 0.20 | 300 | B | A |
| | 26 | 1 | 16 | 300 | 3.00 | 0.60 | 0.20 | 300 | B | A |
| | 27 | 1 | 17 | 300 | 3.00 | 0.60 | 0.20 | 300 | B | A |
| | 28 | 1 | 18 | 300 | 3.00 | 0.60 | 0.20 | 300 | B | A |
| | 29 | 1 | 19 | 300 | 3.00 | 0.60 | 0.20 | 300 | B | A |
| | 30 | 1 | 20 | 300 | 3.00 | 0.60 | 0.20 | 300 | B | A |
| | 31 | 1 | 21 | 300 | 3.00 | 0.60 | 0.20 | 300 | B | A |
| | 32 | 1 | 22 | 300 | 3.00 | 0.60 | 0.20 | 300 | A | A |
| | 33 | 1 | 23 | 300 | 3.00 | 0.60 | 0.20 | 300 | A | B |
| | 34 | 1 | 15 | 300 | 3.00 | 0.60 | 0.20 | 300 | B | A |
| | 35 | 1 | 24 | 300 | 3.00 | 0.60 | 0.20 | 300 | A | B |
| | 36 | 1 | 25 | 300 | 3.00 | 0.60 | 0.20 | 300 | A | B |

TABLE 5

Composition, Properties and Evaluation Results of Inks

| | | Composition | | Properties | | | | Evaluation result | |
|---|---|---|---|---|---|---|---|---|---|
| | | Pigment dispersion liquid Kind | Additive Kind | Pigment content P(%) | Resin content R(%) | R/P (times) | Specific additive content (ppm) | Storage stability | Image clarity |
| | | | Amount (ppm) | | | | | | |
| Example | 37 | 1 | 26 | 300 | 3.00 | 0.60 | 0.20 | 300 | A | B |
| | 38 | 1 | 27 | 300 | 3.00 | 0.60 | 0.20 | 300 | A | B |
| | 39 | 1 | 28 | 300 | 3.00 | 0.60 | 0.20 | 300 | A | B |
| | 40 | 1 | 7 | 300 | 3.00 | 0.60 | 0.20 | 300 | A | A |
| | 41 | 12 | 1 | 300 | 3.00 | 0.60 | 0.20 | 300 | B | A |

TABLE 5-continued

Composition, Properties and Evaluation Results of Inks

| | | Composition | | | Properties | | | | Evaluation result | |
|---|---|---|---|---|---|---|---|---|---|---|
| | | Pigment dispersion liquid Kind | Additive Kind | Additive Amount (ppm) | Pigment content P(%) | Resin content R(%) | R/P (times) | Specific additive content (ppm) | Storage stability | Image clarity |
| | 42 | 13 | 1 | 300 | 3.00 | 0.60 | 0.20 | 300 | B | A |
| | 43 | 14 | 1 | 300 | 3.00 | 0.60 | 0.20 | 300 | B | A |
| | 44 | 15 | 1 | 1,000 | 3.00 | 0.60 | 0.20 | 1,000 | B | A |
| | 45 | 16 | 1 | 300 | 3.00 | 0.42 | 0.14 | 300 | B | A |
| | 46 | 17 | 1 | 300 | 3.00 | 0.45 | 0.15 | 300 | AA | A |
| | 47 | 18 | 1 | 300 | 3.00 | 0.90 | 0.30 | 300 | AA | A |
| | 48 | 19 | 1 | 300 | 3.00 | 0.93 | 0.31 | 300 | B | A |
| | 49 | 20 | 1 | 300 | 3.00 | 0.60 | 0.20 | 300 | B | A |
| | 50 | 21 | 1 | 300 | 3.00 | 0.60 | 0.20 | 300 | AA | A |
| | 51 | 22 | 1 | 300 | 3.00 | 0.60 | 0.20 | 300 | AA | A |
| | 52 | 23 | 1 | 300 | 3.00 | 0.60 | 0.20 | 300 | AA | B |
| | 53 | 24 | 1 | 300 | 3.00 | 0.60 | 0.20 | 300 | B | A |
| | 54 | 25 | 1 | 300 | 3.00 | 0.60 | 0.20 | 300 | AA | A |
| | 55 | 26 | 1 | 300 | 3.00 | 0.60 | 0.20 | 300 | AA | A |
| | 56 | 27 | 1 | 300 | 3.00 | 0.60 | 0.20 | 300 | AA | B |
| | 57 | 28 | 1 | 300 | 3.00 | 0.60 | 0.20 | 300 | AA | A |
| | 58 | 29 | 1 | 300 | 3.00 | 0.60 | 0.20 | 300 | AA | A |
| | 59 | 30 | 1 | 300 | 3.00 | 0.60 | 0.20 | 300 | B | A |
| | 60 | 31 | 10 | 300 | 3.00 | 0.93 | 0.31 | 300 | B | B |
| Comparative Example | 1 | 32 | 1 | 300 | 3.00 | 0.00 | 0.00 | 300 | N/A | N/A |
| | 2 | 33 | 1 | 300 | 3.00 | 0.00 | 0.00 | 300 | C | C |
| | 3 | 1 | 29 | 300 | 3.00 | 0.60 | 0.20 | 0 | B | C |
| | 4 | 1 | 30 | 300 | 3.00 | 0.60 | 0.20 | 0 | B | C |
| | 5 | 1 | 31 | 300 | 3.00 | 0.60 | 0.20 | 0 | B | C |
| | 6 | 1 | 32 | 300 | 3.00 | 0.60 | 0.20 | 0 | A | C |
| | 7 | 1 | 33 | 300 | 3.00 | 0.60 | 0.20 | 0 | B | C |
| | 8 | 1 | 1 | 150 | 3.00 | 0.60 | 0.20 | 150 | AA | C |
| | 9 | 1 | 1 | 1,250 | 3.00 | 0.60 | 0.20 | 1,250 | C | A |
| | 10 | 1 | 30 | 5,000 | 3.00 | 0.60 | 0.20 | 0 | C | C |
| | 11 | 34 | 34 | 900 | 3.00 | 0.60 | 0.20 | 0 | C | C |
| | 12 | 35 | 35 | 1,500 | 3.00 | 0.60 | 0.20 | 0 | C | C |
| | 13 | 1 | 36 | 300 | 3.00 | 0.60 | 0.20 | 0 | B | C |

For the inks of Examples 32 and 40, the storage stability was rated A, and the image clarity was rated A. However, the ink of Example 40 was superior in both the storage stability and the image clarity to the ink of Example 32.

Thus, the present disclosure can provide an aqueous ink jet ink that has high storage stability and can form an image with high image clarity, an ink cartridge using the aqueous ink, and an ink jet recording method.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-123600 filed Jul. 28, 2021 and Japanese Patent Application No. 2022-106239 filed Jun. 30, 2022, which are hereby incorporated by reference herein in their entirety.

What is claimed is:

1. An aqueous ink for ink jet recording, comprising:
a pigment;
a resin; and
an additive, wherein
the resin has a unit containing a carboxylic acid group and a unit containing an aromatic group,
the additive comprises at least one member selected from the group consisting of butanedicarboxylic acid, pentanedicarboxylic acid, pentanetricarboxylic acid, hexanedicarboxylic acid, hexanetricarboxylic acid, heptanetricarboxylic acid, octanetricarboxylic acid and nonanetricarboxylic acid, and
the content of the additive is 180 ppm or more to 1,200 ppm or less with respect to the total mass of the ink.

2. The aqueous ink according to claim 1, wherein the additive comprises hexanetricarboxylic acid.

3. The aqueous ink according to claim 1, wherein the additive comprises at least one member selected from the group consisting of 1,3,5-hexanetricarboxylic acid, 1,4,5-hexanetricarboxylic acid, 3-methyl-2,3,5-hexanetricarboxylic acid, 5-methyl-1,3,5-hexanetricarboxylic acid, 5-methyl-1,4,5-hexanetricarboxylic acid and 3-methyl-1,3,6-hexanetricarboxylic acid.

4. The aqueous ink according to claim 1, wherein the pigment has a quinacridone skeleton, a diketopyrrolopyrrole skeleton or a perylene skeleton.

5. The aqueous ink according to claim 1, wherein the content of the resin is 0.15 or more to 0.30 or less in terms of mass ratio with respect to a content of the pigment.

6. The aqueous ink according to claim 1, wherein the content of the additive is 3.0% by mass or more to 20.0% by mass or less with respect to a content of the resin.

7. The aqueous ink according to claim 1, wherein the content of the additive is 0.6% by mass or more to 4.0% by mass or less with respect to a content of the pigment.

8. The aqueous ink according to claim 1, wherein a weight average molecular weight of the resin is 6,000 or more to 15,000 or less.

9. The aqueous ink according to claim 1, wherein the resin has a dispersity of 3.4 or more, the dispersity being defined as Mw/Mn being a ratio of a weight average molecular weight Mw of the resin to a number average molecular weight Mn of the resin.

10. The aqueous ink according to claim 1, wherein the resin has a dispersity of 3.4 or more to 5.0 or less, the dispersity being defined as Mw/Mn being a ratio of a weight average molecular weight Mw of the resin to a number average molecular weight Mn of the resin.

11. The aqueous ink according to claim 1, wherein an acid value of the resin is 110 mg KOH/g or more to 160 mg KOH/g or less.

12. The aqueous ink according to claim 1, wherein the resin is a resin dispersant for dispersing the pigment.

13. The aqueous ink according to claim 1, wherein the content of the additive is 200 ppm or more to 500 ppm or less with respect to the total mass of the ink.

14. An aqueous ink for ink jet recording, comprising:
a pigment;
a resin; and
an additive, wherein
the resin has a unit containing a carboxylic acid group and a unit containing an aromatic group,
the additive is a compound containing a $C_4$-$C_9$ alkyl chain and two or three carboxylic acid groups and
a content of the additive is 180 ppm or more to 1,200 ppm or less with respect to the total mass of the ink.

15. An ink cartridge comprising an ink, and an ink storage portion storing the ink, wherein
the ink comprises the aqueous ink according to claim 1.

16. An ink jet recording method of recording an image onto a recording medium by ejecting an ink from an ink jet recording head, wherein
the ink comprises the aqueous ink according to claim 1.

* * * * *